United States Patent [19]

McCrickerd

[11] Patent Number: 4,542,956

[45] Date of Patent: Sep. 24, 1985

[54] FIBER OPTICS TRANSFER SYSTEMS

[75] Inventor: John T. McCrickerd, Costa Mesa, Calif.

[73] Assignee: Newport Corporation, Fountain Valley, Calif.

[21] Appl. No.: 454,902

[22] Filed: Dec. 30, 1982

[51] Int. Cl.[4] .............................................. G02B 7/26
[52] U.S. Cl. ............................ 350/96.20; 350/96.18
[58] Field of Search ............... 350/96.15, 96.18, 96.20, 350/96.21; 250/227

[56] References Cited

U.S. PATENT DOCUMENTS

| | | | |
|---|---|---|---|
| 4,060,309 | 11/1977 | Le Noane et al. | 350/96.18 |
| 4,265,511 | 5/1981 | Nicia et al. | 350/96.18 |
| 4,303,301 | 12/1981 | Teichert et al. | 350/96.18 |
| 4,318,586 | 3/1982 | Coyne | 350/96.18 X |
| 4,447,119 | 5/1984 | Beasley | 350/96.18 |

Primary Examiner—John Lee
Attorney, Agent, or Firm—Benoit Law Corporation

[57] ABSTRACT

Methods and apparatus for passing laser light into an optical fiber having a light input face thereacross, focus the laser light onto a front focus plane of focusing means for forming a spatial spectrum of light distribution in which noise frequencies are spatially distributed about a central spot of light. The position of the light input face of the fiber is coarsely adjusted relative to the focus plane for capturing with the fiber the central spot of light to the exclusion of distributed noise frequencies. The central spot of light is finely adjusted in position on the light input face of the fiber by tilting the focusing means and the light input face of the fiber until a maximum of light energy from the central spot is transmitted through the input face and the fiber. The latter tilting preferably is effected relative to a rear focal plane of the focusing means or about a pivot in such rear focal plane.

26 Claims, 5 Drawing Figures

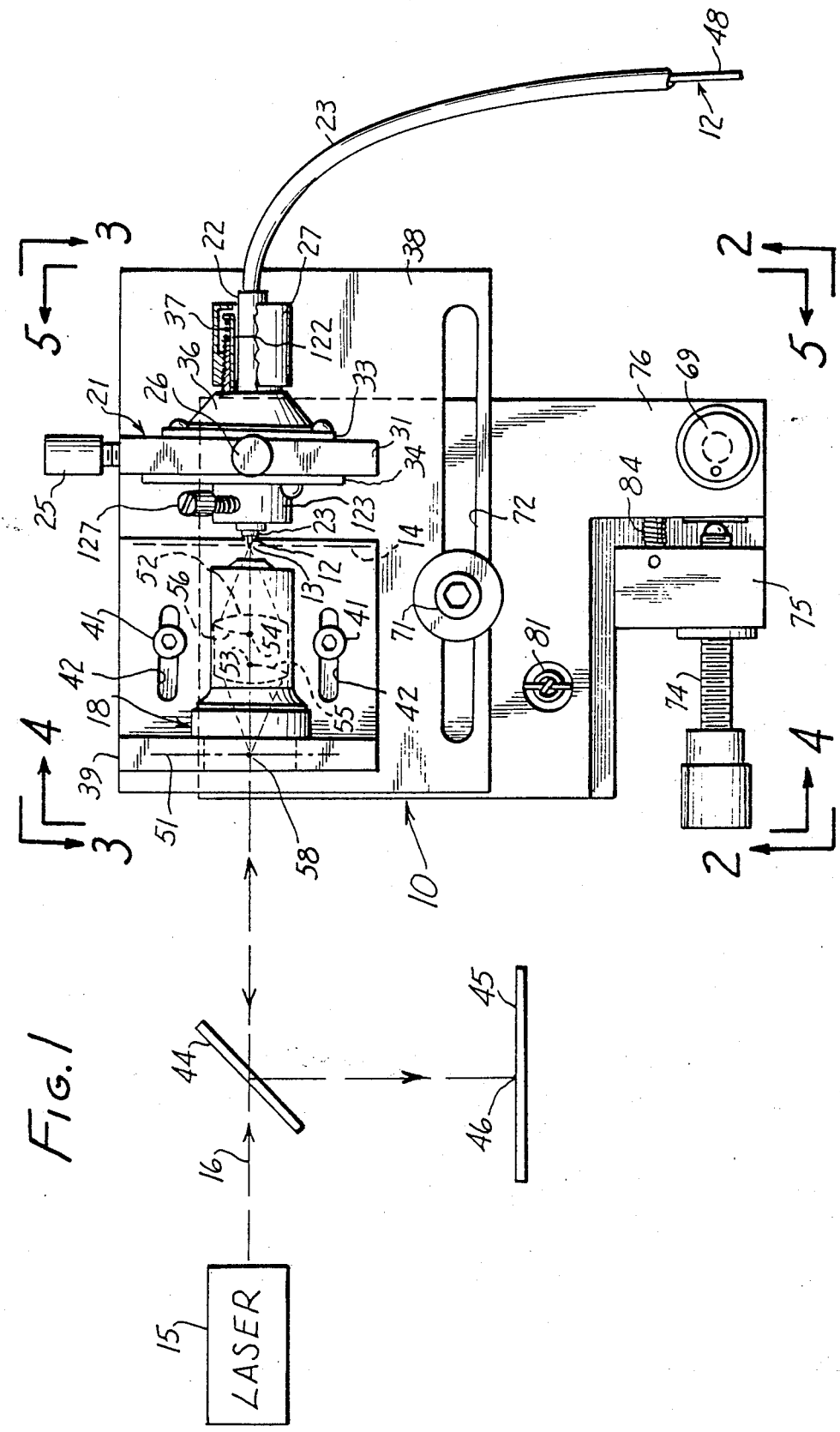

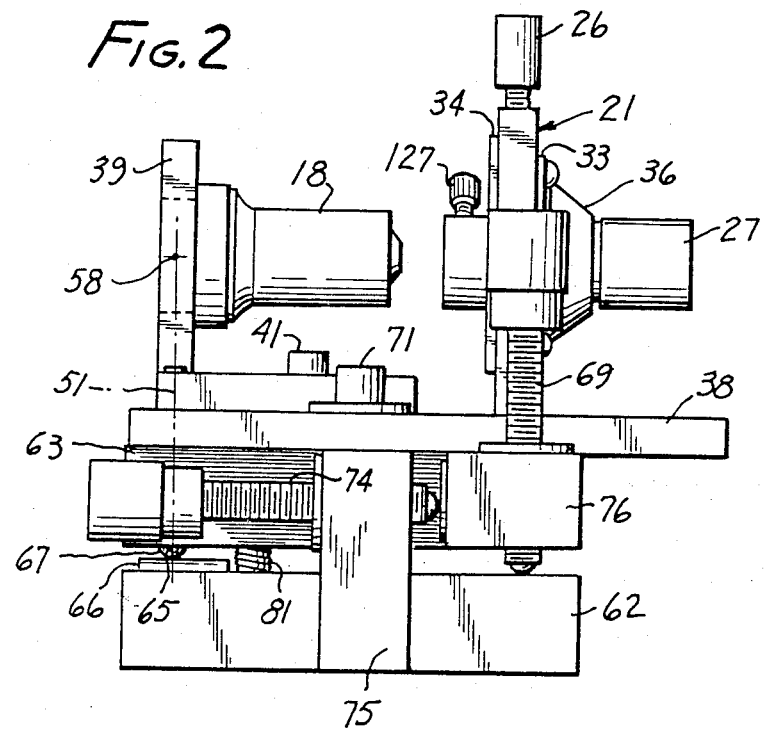
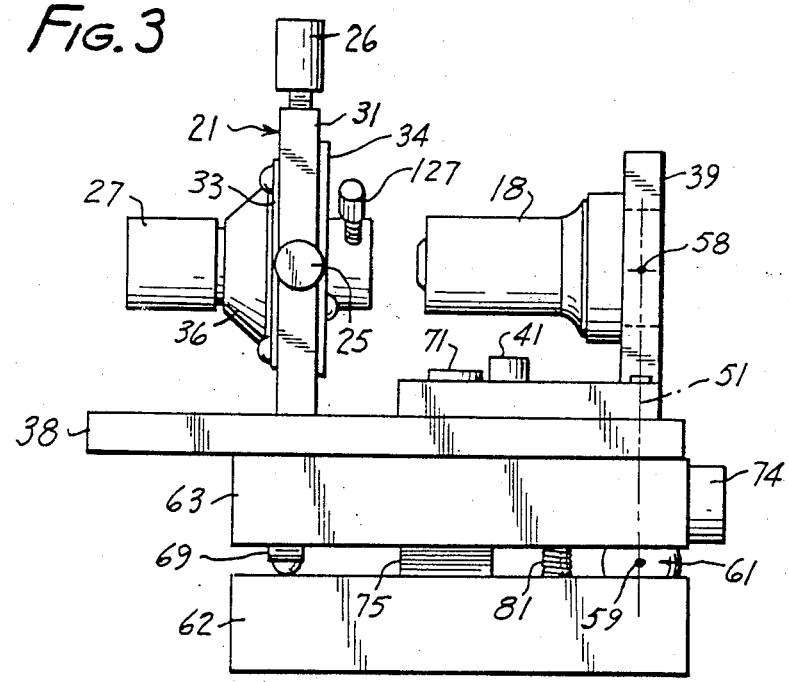

FIBER OPTICS TRANSFER SYSTEMS

BACKGROUND OF THE INVENTION

1. Field of the Invention

The subject invention relates to radiant energy generation and transmission, to radiant energy filtering, to optical filters, to opto-mechanical spatial filters, to fiber optics systems, to methods and apparatus for filtering spatial noise frequencies from a laser beam, and to component mounts.

2. Disclosure Statement

This disclosure statement is made pursuant to the duty of disclosure imposed by law and formulated in 37 CFR 1.56(a). No representation is hereby made that information thus disclosed in fact constitutes prior art inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments subsequent in time or priority.

For many uses, a laser beam must have a smooth intensity profile. For instance, in optical data processing or transmission, useful information can be completely lost if the input plane illumination is not smooth, while in holography important details can be surpressed or spotty film exposures can produce "dirty" reconstructions. The ideal $TEM_{oo}$ intensity profile approaches a Gaussian distribution. However, in practice, such "ideal" beam picks up unwanted intensity fluctuations, typically caused by interference effects from light scattered by dust particles in the air, on the mirrors and lenses, and from lens defects. Such intensity fluctuations usually vary rapidly and randomly over distances smaller than beam radius. Focusing of this actual light onto the focal plane of a positive lens forms the optical power spectrum of light distribution in which the higher-frequency noise spectrum is usually separated from the focused Gaussian shape.

It would thus be possible to employ a spatial filter to block unwanted light so as to pass a uniform intensity profile. In this respect, pinholes have been employed for selectively filtering out higher spatial frequencies, while passing a major portion of the total beam power relatively free of noise.

For the theory of operation just provided, as well as for an example of an existing spatial filter, reference may be had to pages 70 and 71 of the 1977-78 Catalog of the assignee of the entire interest hereof. In particular, the assignee's spatial filter shown therein has a pinhole provided in a wafer movable in a spatial coordinate system relative to a focusing lens objective with the aid of three manually adjustable micrometers. In practice, the latter solution represents a rather expensive and complicated approach.

Another existing spatial filter arranged the focusing lens system behind a tiltable mounting plate, as seen from the source of the laser beam. The lens system was disposed in a tubular mount, a rear portion of which extended through the tiltable mounting plate for the reception of the laser beam from the source. A wafer including the pinhole was mounted at a tip of the tubular mount, for tilting jointly with the lens system.

In particular, the mounting plate of the lens system or fixture and of the pinhole was tilted in an endeavor to bring the focus of the laser beam into coincidence with the pinhole by means of a consequent displacement of the pinhole and focus spot relative to each other. In practice, trial and error was employed in seeking an appropriate displacement. However, since in that prior structure the lens system and pinhole were both shifting, albeit by different amounts, the shift of the lens relative to the input laser beam caused the beam to be shifted off axis and the pattern of light through the pinhole to be changed as a result of spatial filter adjustments. In consequence, by the time an operator had found the right place for the pinhole, the beam had shifted laterally and the transmitted light pattern had changed objectionably.

In a different vein, it is known that optical systems have nodal points which are defined as two axial points so located that an oblique ray directed at a first nodal point appears, after passing through the system, to emerge from the second nodal point parallel to its original direction (see HANDBOOK OF OPTICS, by Walter G. Driscoll et al (McGraw-Hill, 1978) p. 2-5. As there stated, the nodal points coincide with the principal points, when an optical system is bounded on both sides by air, as is true in the great majority of applications.

In pinhole-type optical filters, tilting of the lens system and pinhole about the first nodal point could be advantageous, so as to avoid tilting of the focused beam. As the subject invention shows, that principle would, however, not necessarily be transferrable beyond its proper context. Thus, even though both the last-described system and the subject invention employ a kind of panning of the type used in the handling of cameras for varying the location of the image on the film, principles of one system are not readily transferrable to another in the area under consideration.

There is also a need in fiber optics transmission systems of improved methods and apparatus for passing light into fibers in an improved manner, reducing losses and distortions.

SUMMARY OF THE INVENTION

It is a general object of this invention to overcome the disadvantages and satisfy the needs expressed or implicit in the above disclosure statement or in other parts hereof.

It is a related object of this invention to provide improved radiant energy generation and transmission.

It is a germane object of this invention to provide improved radiant energy filtering and improved optical filters.

It is a related object of this invention to provide improved fiber optics transmission systems.

It is a germane object of this invention to provide improved methods and apparatus for filtering spatial noise frequencies from laser beams.

It is also an object of this invention to provide improved methods and apparatus for passing laser light into optical fibers.

It is also an object of this invention to provide improved optical data processing and optical data processing systems.

It is a further object of this invention to provide improved holography systems.

Other objects of this invention will become apparent in the further course of this disclosure.

The subject invention resides in methods and apparatus for passing laser light into an optical fiber core having a light input face thereacross, comprising, in combination, the steps of, or means for, focusing the laser light onto a front focus plane of focusing means for forming a spatial spectrum of light distribution in which noise frequencies are spatially distributed about a central spot of light, coarsely adjusting the position of the light input face of the core relative to said focus plane for capturing with said core said central spot of light to the exclusion of distributed noise frequencies, and tilting the focusing means and the light input face of the core relative to a rear focal plane of the focusing means for finely adjusting said central spot of light in position on the light input face of the core until a maximum of light energy from said spot is transmitted through the input face of the core.

According to a preferred embodiment of the invention, coupling of the light energy is maximized into the $HE_{11}$ mode to the fiber core by adjusting the angular incidence of said focused laser light on said light input face of the core.

Other aspects of the invention will become apparent in the further course of this disclosure, and no limitation to any object, aspect, combination, component, feature or element is intended by the subject summary of the invention.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which:

FIG. 1 is a top view of apparatus for passing laser light into an optical fiber;

FIG. 2 is a view of the apparatus of FIG. 1 taken on the line 2—2 in FIG. 1;

FIG. 3 is a view of the apparatus of FIG. 1 taken on the line 3—3 in FIG. 1;

DESCRIPTION OF PREFERRED EMBODIMENTS

Figure 4:
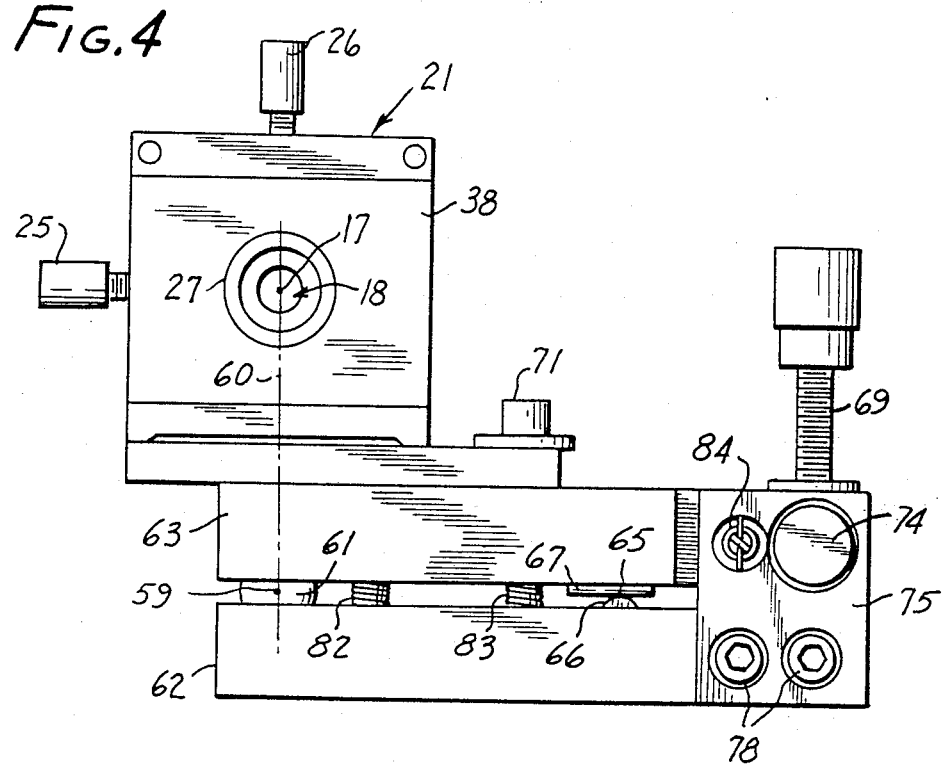
FIG. 4 is a view of the apparatus of FIG. 1 taken on the line 4—4 in FIG. 1.

The apparatus 10 shown in the drawings may implement a method of, or constitute an apparatus for, passing laser light into an optical fiber 12 having a light input face 13 thereacross. Alternatively, the apparatus 10 may be used as or constitute a spatial filter using the fiber 12 with input face 13 for the purpose of or as means for capturing a focused Gaussian shape or central spot of light to the exclusion of distributed noise frequencies, as hereinafter more fully explained. The expression "laser light" as herein employed is intended to refer broadly to coherent in-phase radiation and to plane or nearly plane spherical waves focusable onto the fiber light input face 13 or onto a focal or focus plane 14 thereat.

The apparatus 10 receives light from a laser 15 which preferably points its laser light or beam 16 exactly into the center 17 (see FIG. 4) of a focusing means or microscope objective 18. The microscope objective 18 focuses the laser light 16 onto a front focus plane 14 of these focusing means, for forming a spatial spectrum of light distribution in which noise frequencies are spatially distributed about a central spot of light.

The apparatus 10 includes a fiber mounting structure 21 for positioning the fiber 12 with its light input face 13 relative to the microscope objective 18 or focus plane 14. To this end, a tubular fiber mounting element 22 may be employed. Where the fiber has a cladding and/or sheathing 23, the tubular element 22 may mount such sheathing and/or cladding along with the fiber 12 or fiber core. In this respect, typical optical fibers have a longitudinal core for light transmission inside one or more transparent claddings of different refractive index or indices for total internal reflection back into the core.

Typical optical fibers also have a plastic sheathing to prevent scratching of the cladding. Such sheathing is cut back from the fiber end face 13.

Figure 5:
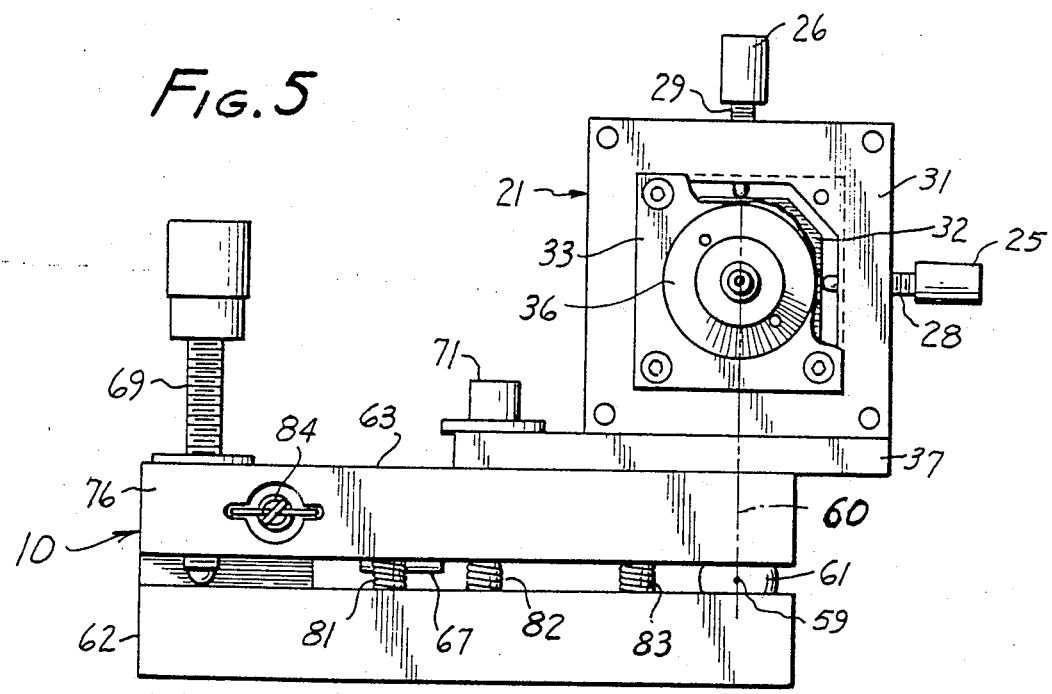
FIG. 5 is a view of the apparatus of FIG. 1 taken on the line 5—5 in FIG. 1.

The fiber mounting structure 21 has x, y and z position controls 25, 26 and 27. As seen in FIG. 5, the x and y position controls 25 and 26 comprise manually actuable screws 28 and 29 threaded through a frame 31 of the mounting structure 21. The screw 28 acts on a first side of a chuck holder plate 32, while the screw 29 acts on a second side of the plate 32 extending at right angles to the mentioned first side thereof. The chuck holder plate 32 has flanges 33 and 34 extending onto the frame 31 at opposite sides thereof. The plate 32 with flanges 33 and 34 mounts the chuck 36 which releasably retains the tubular fiber mount 22 and thereby the fiber 12.

A first conventional spring (not shown) may be employed between the frame 31 and plate 32 at a side opposite the screw 28, in order to bias the chuck mounting plate in the x direction. Similarly, a second spring (not shown) may be employed between the frame 31 and plate 32 at a side opposite the screw 29, in order to bias the chuck mounting plate 32 in the y direction against the screw 29. Accordingly, the position of the fiber end or light input face 13 may be adjusted in the x-y directions by manipulation of the side and top controls 25 and 26.

A similar principle may, if desired, be employed for effecting the z adjustment. Alternatively or additionally, the microscope objective 18 may be rendered adjustable for a variation of the focus plane 14 in the z direction.

In the illustrated embodiment, the z positioning device 27 is a cap threaded onto an axial extension of the fiber mounting chuck 36 or chuck body.

That cap 27 acts on a flanged sleeve 122 which receives the tubular fiber mount 22, extends through the chuck to the other side of the plate 34 and has a flange 123 provided with a set screw 127 acting on the tubular fiber mount 22. Initially, the set screw 127 is loosened to permit insertion of the tubular fiber mount 22 into the chuck. The screw 127 is then tightened against the tubular fiber mount 22, so as to render the light input face 13 movable with the sleeve 122 in the chuck 36. The threaded cap 27 is rotated so that the sleeve 122 is translatorily moved selectively with and against the bias of a spring 37 until the fiber light input face 13 is located in the focus plane 14.

The mounting structure 21 may be affixed to, and extend uprightly from a base 38 on which a bracket 39 for mounting the microscope objective 18 may be located. A certain rough z-type adjustment may be realized by mounting the bracket 39 to the base 38 with screws 41 extending through elongate slots 42.

A pellicle beam splitter 44 or similar device is inserted between the laser 15 and the apparatus 10 or microscope objective 18 as shown in FIG. 1, in order to intercept light reflected back from the light input face 13 of the fiber 12 through the microscope objective 18. The beam splitter 44 projects such reflected light onto a sheet of paper or other screen 45 positioned laterally of the main laser beam 16. The screen 45 preferably should be located at the same distance from the beam splitter 44 as the output aperture of the laser 16. The laser light is thus originally projected through the focusing means 18 onto the light input face 13 of the fiber 12 for reflection of part of such laser light back through the focusing means, with the beam splitter 44 aiding in projecting such reflected light part onto the screen 45.

The position of the light input face 13 of the fiber relative to the focus plane 14 is coarsely adjusted for capturing with the core of the fiber 12 the central spot of light to the exclusion of distributed noise frequencies in the spatial spectrum of light distribution formed by the focusing means 18 at the focus plane 14.

The coarse adjustment just described may be effected by manipulation and setting of the x, y and z controls 25, 26 and 27. Within the scope of the subject invention, other means and methods, including precise machining of a fiber mount and adjustment of the focusing means may be employed for effecting the required coarse adjustment.

In practice, the coarse z-adjustment is continued until a small spot 46 of reflected light appears on the screen 45. Further z-adjustment may be effected until the spot 46 is as small as possible. In this respect, the use of a reflected wavefront for focusing purposes according to the illustrated embodiment of the subject invention is twice as precise as using light transmitted through the fiber for that purpose would be, since the laser beam or light goes forward and reverse along the same path.

The focus plane 14 in which the light input face 13 of the fiber is positioned may be at the front focal point of the microscope objective. However, if the light from the laser 15 is not exactly parallel, the focus plane 14 may in practice be slightly spaced from the front focal point.

Ideally, the central spot of laser light picked up by the light input face 13 has a Gaussian-shape $TEM_{oo}$ or, in the case of a step-index single-mode fiber 12, $HE_{11}$ intensity profile. However, even some slight deviation from this ideal still permits the spatial filter constituted by the apparatus 10 to eliminate spatially distributed noise frequencies from the focused laser light.

Once the z-type or focus adjustment has been completed, the beam splitter 44 may be removed from the laser beam 16 and the x-z position controls 25 and 26 may be adjusted until transmitted light becomes observable at a free end 48 of the fiber core.

The focusing means 18 and the light input face of the fiber 12 may then be tilted for finely adjusting the central spot of light in position on the core at the light input face 13 until a maximum of filtered light energy from the laser or picked-up central spot is transmitted through the core at the input face and thereby along the fiber core. The tilting fine adjustment may be referred to as "panning" in similarity to the panning of a camera.

In order to control the angular orientation at which the focus-point enters the fiber core, the laser beam 16 may be adjusted, such as by fine adjustment of the transverse or x-y position of the laser 15 or by a tilting thereof. These adjustments, as well as the tilting of the fiber input face 13 and focusing means 18 are continued until the light leaking out through the side of the free end 48 of the fiber is observed to be a minimum.

In other words, optimum adjustment exists when a minimum of light leaks out of the side of the fiber, signifying that the light travels practically entirely along the core of the fiber 12, and not into the cladding about the core. Coupling of light energy into an $HE_{11}$ mode or otherwise to the core of the fiber may be maximized by adjusting the angular incidence of the focused laser light on the core at the light input face 13, by shifting the laser beam 16, such as by transverse relative movement of the laser 15 and apparatus 10.

Maximum light transmission also requires that the light at the central spot enter the fiber core exactly at its center. To this end, the subject invention employs a tilting operation of the focusing means 18 and the light input face 13 or core of the fiber, preferably relative to a rear focal plane 51 of the focusing means.

Some explanation about parameters of optical systems may be helpful at this juncture. To this end, a dotted outline 52 in the form of a lens represents in FIG. 1 the optical system of the focusing means 18. That optical system has two nodal points 53 and 54 defined, as noted above, as two axial points so located that an oblique ray directed at a first nodal point 53 appears, after passing through the system 52, to emerge from the second nodal point 54 parallel to its original direction. As also noted, nodal points coincide with the principal points or planes 55 and 56, when the optical system 52 is bounded by air.

In conventional spatial filters of the pinhole type, tilting of the lens system and pinhole about the first nodal point would appear to be advantageous, so as to avoid tilting of the focused beam with resulting transmission losses or distortions.

However, in contrast to that approach, preferred embodiments of the subject invention tilt the focusing means 18 or lens system 52 and the fiber or core at the light input face 13 relative to a rear focal point 58 of the focusing means or lens system. In practice, this has the advantage that the adjusted angular incidence of the focused beam on the core at the fiber input face 13 remains intact when the system is tilted for centering of the focused light spot on the fiber core, as herein disclosed.

In this respect, the focal point of the lens system or focusing means is the point to which rays parallel to the optical axis converge or appear to converge after passing through the optical system. Accordingly, the focusing means 18 or optical system 52 has a front focal point on or proximate to the fiber input face 13. The rear focal point 58 is located opposite the front focal point relative to the optical system 52 and is the point at which paraxial rays parallel to the optical axis and incident on the optical system from the right-hand side as seen in FIG. 1 would be converged. Reference may in this respect be had to FIG. 6 on page 2-9 of the above mentioned HANDBOOK OF OPTICS, showing first and second focal points, and to the definitions on page 2-4 under "Back Focal Point, or Second Focal Point," for a definition of the rear focal point, and to the definitions on page 2-5 for "Front Focal Point or First Focal Point."

In principle, and within the scope of the subject invention, tilting of the focusing means 18 and fiber optic core or face 13 actually can take place about the rear focal point 58. Once this point has been recognized according to the subject invention, a mechanical gimbal structure (not shown) could be employed in a conventional manner for accomplishing such tilting.

For most purposes, tilting of the focusing means and the light input face 13 of the fiber or core may be effected about a pivot 59 in a rear focal plane 51 of the focusing means, as, for instance seen in FIG. 3. In the illustrated embodiment, the pivot point 59 is also located in a vertical longitudinal plane 60 through the center of the focusing means 18, as seen in FIGS. 4 and 5.

Also in the illustrated embodiment of the invention, the tilt pivot or pivot point 59 is provided by a steel ball 61 inserted between two baseplates 62 and 63 and held in corresponding cavities therein. As may be seen from the drawings, the pivot 59 is a single pivot between the first baseplate 62 and second baseplate 63, for rendering tht second baseplate rotatable about that single pivot relative to the first baseplate and tiltable also about that single pivot relative to that first baseplate 62.

The horizontal first or bottom baseplate 62 may be attached to an optical table or similar structure (not shown). The second or top baseplate 63 is tiltable relative to the first baseplate 62 about the pivot 59 or steel ball 61. A pair of crossed semi-cylindrical support contact members 66 and 67 attached to or embedded in the baseplates 62 and 63, respectively, serve in combination with adjustment screws 69 and 74 to define the angular orientation of top baseplate 63 and components mounted thereon, relative to the pivot point 59, at a contact point 65.

The base 38 of the microscope objective 18 and the optical fiber mounting structure 21 is attached to the top baseplate 63 by one or more screws 71 extending through an elongate slot 72 in the base 38. The base 38 with slot 72 and screw 71 thus acts as a means for positioning the rear focal plane 51 of the or any other objective 18 on the pivot point 59 about which the objective or focusing means 18 and the light input face 13 of the core are tilted.

The screw 69 acts in a vertical direction as seen in FIGS. 2 to 5 between the pivoted baseplates 62 and 63, and thereby permits tilting pitch adjustments in the assembled focusing means 18 and fiber end at 13. Yaw adjustments, on the other hand, may be effected by means of a second screw 74 which extends at right angles to the first tilt screw 69.

In particular, the second tilt screw 74 extends through a block 75 into contact with an extension 76 of the top baseplate 63 through which the first tilt screw 69 also extends. The block 75 through which the second tilt screw 74 extends is integral with the bottom baseplate 62 or is attached thereto by screws 78. The focusing means and the light input face of the fiber core may thus be tilted by tilting the second baseplate 63 relative to the first baseplate 62.

In this manner, the focusing means 18 and mounted fiber input face 13 or fiber end thereat may selectively be subjected to yaw and pitch variations and other tilt adjustments composed of yaw and pitch variations in varying degrees, whereby the position of the focused central spot of light on the fiber input face 13 may be finely adjusted for maximum energy transfer into the fiber core. During yaw adjustments, the top baseplate 63 is axially moved relative to the bottom baseplate 62 about the pivot point 59 or ball 61, with the cylindrical contact member 67 sliding along the contact member 66. Springs 81, 82 and 83 are anchored in and extend between the bottom and top baseplate 62 and 63 in order to maintain the baseplate in contact with the pivot ball 61 and the cylindrical contact elements 66 and 67 in engagement with each other, and in order to maintain the tip of the vertical pivot screw 69 in contact with the lower baseplate 62. Similarly, a spring 84 is anchored in and extends between the baseplate block 75 and extension 76 in order to maintain the extension 76 of the top baseplate 63 in contact with the tip of the vertical adjustment screw 74.

The subject invention and its embodiments meet all of the initially stated objectives and are generally useful in radiant energy generation, transmission and filtering particularly in the laser light area. Among the various uses to which light transmitted into the optical fiber 12 may be put, the fields of spatial filtering, holography, data transmission and processing, testing and measuring are here particularly mentioned by way of example, and not by way of limitation.

In particular, the subject invention permits the central spot of light of the focused laser beam to be positioned exactly on the center of the light input face 13 of the fiber core to the exclusion of the fiber cladding around the core. As a particular advantage, the position of incidence of the central spot of light on the fiber core face can be finely adjusted by tilting according to the subject invention without disturbing a desired angle of incidence of the focused laser beam on the fiber core face. As a further particular advantage, the invention effectively keeps light of the desired distribution out of the cladding, whereby maximum transmission of the available light energy takes place through the core only. Any spatially distributed noise impinging on the cladding end face is readily attenuated by the cladding, adding to the effect of the systems of the subject invention as advanced spatial filters.

The subject extensive disclosure renders apparent and suggests to those skilled in the art various modifications and variations within the spirit and scope of the subject invention and equivalents thereof.

I claim:

1. A method of passing laser light into an optical fiber core having a light input face thereacross, comprising in combination the steps of:
    focusing the laser light onto a front focus plane of focusing means for forming a spatial spectrum of light distribution in which noise frequencies are spatially distributed about a central spot of light;
    coarsely adjusting the position of the light input face of the core relative to said focus plane for capturing with said core said central spot of light to the exclusion of distributed noise frequencies; and
    tilting the focusing means and the light input face of the core relative to a rear focal plane of the focusing means for finely adjusting said central spot of light in position on the light input face of the core until a maximum of light energy from said spot is transmitted through the input face of the core.

2. A method as claimed in claim 1, wherein said tilting relative to said rear focal plane includes the steps of:
    providing a pivot in said rear focal plane of the focusing means; and
    tilting the focusing means and the light input face of the core about said pivot.

3. A method as claimed in claim 1, including the step of:
maximizing coupling of said light energy to the core of the fiber by adjusting the angular incidence of said focused laser light input on the core at said light input face.

4. A method as claimed in claim 3, wherein said tilting relative to said rear focal plane includes the steps of:
providing a pivot in said rear focal plane of the focusing means; and
tilting the focusing means and the light input face of the core about said pivot.

5. A method of passing laser light into a core of an optical fiber having a light input face thereacross, comprising in combination the steps of:
focusing the laser light onto a front focus plane of focusing means for forming a spatial spectrum of light distribution in which noise frequencies are spatially distributed about a central spot of light;
projecting said laser light through said focusing means onto said light input face of the fiber for reflection of part of said laser light back through the focusing means;
projecting said reflected part onto a screen;
adjusting said focusing means until said reflected part forms into a spot on said screen;
coarsely adjusting the position of the light input face of the fiber relative to said focus plane for capturing with said core said central spot of light to the exclusion of distributed noise frequencies; and
tilting the focusing means and the light input face of the fiber for finely adjusting said central spot of light in position on the core at the light input face until a maximum of light energy from said spot is transmitted through the core of the fiber.

6. A method as claimed in claim 5, wherein:
said tilting includes tilting the focusing means and the light input face of the fiber relative to a rear focal plane of the focusing means.

7. A method as claimed in claim 5, including the steps of:
providing a pivot in a rear focal plane of the focusing means; and
tilting the focusing means and the light input face of the fiber about said pivot.

8. A method as claimed in claim 5, including the step of:
maximizing coupling of said light energy to the core of the fiber by adjusting the angular incidence of said focused laser light on said core at said light input face of the fiber.

9. A method as claimed in claim 8, wherein:
said tilting includes tilting the focusing means and the light input face of the fiber relative to a rear focal plane of the focusing means.

10. A method as claimed in claim 8, including the steps of:
providing a pivot in a rear focal plane of the focusing means; and
tilting the focusing means and the light input face of the fiber about said pivot.

11. A method of passing laser light via focusing means into an optical fiber core having a light input face thereacross and being part of an optical fiber, comprising in combination the steps of:
providing a horizontal first baseplate;
mounting a second baseplate on top of said horizontal first baseplate via a single pivot between said first baseplate and said second baseplate;
providing a coarsely adjustable mounting structure for adjusting said optical fiber separately from said focusing means;
locating said focusing means and said mounting structure on top of said second baseplate, so that an optical axis of said focusing means extends in parallel to said second baseplate at a distance therefrom;
focusing the laser light onto a front focus plane of said focusing means for forming a spatial spectrum of light distribution in which noise frequencies are spatially distributed about a central spot of light;
coarsely adjusting the position of the light input face of the core relative to said focus plane for capturing with said core said central spot of light to the exclusion of distributed noise frequencies; and
finely adjusting said central spot of light in position on the light input face of the core by selectively rotating said second baseplate about said single pivot and by tilting said second baseplate relative to said first baseplate about said single pivot for tilting the focusing means and the light input face of the core unfil a maximum of light energy from said spot is transmitted through the input face of the core.

12. A method as claimed in claim 11, wherein:
said single pivot is located in a rear focal plane of said focusing means; and
said tilting includes tilting said second baseplate and thereby said focusing means and the light input face of the core relative to said rear focal plane of the focusing means.

13. A method as claimed in claim 11, wherein:
said single pivot is provided in a rear focal plane of the focusing means; and
said tilting includes tilting said second baseplate and thereby the focusing means and the light input face of the core relative to said rear focal plane of the focusing means about said pivot.

14. Apparatus for passing laser light into an optical fiber core having a light input face thereacross, comprising in combination:
means for forming a spatial spectrum of light distribution in which noise frequencies are spatially distributed about a central spot of light, including means for focusing the laser light onto a front focus plane of said focusing means;
means for coarsely adjusting the position of the light input face of the core relative to said focus plane for capturing with said core said central spot of light to the exclusion of distributed noise frequencies; and
means connected to the focusing means and the fiber for finely adjusting said central spot of light in position on the light input face of the core so that a maximum of light energy from said spot is transmitted through the input face of the core including means for tilting the focusing means and the light input face of the core relative to a rear focal plane of the focusing means.

15. Apparatus as claimed in claim 14, wherein:
said tilting means include a pivot in a rear focal plane of the focusing means and means for tilting the focusing means and the light input face of the core about said pivot.

16. Apparatus as claimed in claim 14, including:

means for maximizing coupling of said light energy to the core of said fiber, including means for adjusting the angular incidence of said focused laser light on said light input face of the core.

17. Apparatus as claimed in claim 16, wherein:
said tilting means include a pivot in a rear focal plane of the focusing means and means for tilting the focusing means and the light input face of the core about said pivot.

18. Apparatus as claimed in claim 14, including:
means for diverting light reflected by said light input face of the core back through said focusing means, including means for projecting said reflected light for observation onto a surface.

19. Apparatus as claimed in claim 14, including:
a beam splitter in a path of said laser light for diverting light reflected by said light input face of the core back through said focusing means; and
means for displaying said diverted light.

20. Apparatus as claimed in claim 14, wherein:
said tilting means include a pivot point, means for positioning a rear focal plane of the focusing means on said pivot point, and means for tilting the focusing means and the light input face of the core about said pivot point.

21. Apparatus for passing laser light into an optical fiber core having a light input face thereacross, comprising in combination:
means for forming a spatial spectrum of light distribution in which noise frequencies are spatially distributed about a central spot of light, including means for focusing the laser light onto a focus plane of said focusing means;
means for coarsely adjusting the position of the light input face of the core relative to said focus plane for capturing with said core said central spot of light to the exclusion of distributed noise frequencies;
means connected to the focusing means and the fiber for finely adjusting said central spot of light in position on the light input face of the core so that a maximum of light energy from said spot is transmitted through the input face of the core including means for tilting the focusing means and the light input face of the core; and
means for diverting light reflected by said light input face of the core back through said focusing means, including means for projecting said reflected light for observation onto a surface.

22. Apparatus as claimed in claim 21, wherein said means for diverting light include:
a beam splitter in a path of said laser light for diverting light reflected by said light input face of the core back through said focusing means; and means for displaying said diverted light.

23. Apparatus as claimed in claim 21, wherein:
said tilting means include a pivot point, means for positioning a rear focal plane of the focusing means on said pivot point, and means for tilting the focusing means and the light input face of the core about said pivot point.

24. Apparatus for passing laser light into an optical fiber core having a light input face thereacross, comprising in combination:
means for forming a spatial spectrum of light distribution in which noise frequencies are spatially distributed about a central spot of light, including means for focusing the laser light onto a front focus plane of said focusing means;
means for coarsely adjusting the position of the light input face of the core relative to said focus plane for capturing with said core said central spot of light to the exclusion of distributed noise frequencies; and
means connected to the focusing means and the fiber for finely adjusting said central spot of light in position on the light input face of the core so that a maximum of light energy from said spot is transmitted through the input face of the core, including a horizontal first baseplate and a second baseplate located on top of said first baseplate, a single pivot between said first baseplate and said second baseplate, and means for rendering said second baseplate rotatable about said single pivot relative to said first baseplate and tiltable relative to said first baseplate, and means for locating said focusing means and said coarsely adjusting means on top of said second baseplate so that an optical axis of said focusing means extends in parallel to said second baseplate at a distance therefrom for fine adjustment of said central spot of light in position on said light input face of the fiber core by selective rotation of said second baseplate about said single pivot and by tilting the focusing means and the light input face of the core upon tilting of said second baseplate relative to said first baseplate about said single pivot.

25. Apparatus as claimed in claim 24, including:
means for locating said single pivot in a rear focal plane of said focusing means and for tilting said second baseplate and thereby the focusing means and the light input face of the core relative to said rear focal plane of the focusing means.

26. Apparatus as claimed in claim 24, including:
means for locating said single pivot in a rear focal plane of said focusing means for tilting the focusing means and the light input face of the core relative to said rear focal plane of the focusing means.

* * * * *